United States Patent
Roeder et al.

(10) Patent No.: US 10,787,151 B2
(45) Date of Patent: Sep. 29, 2020

(54) LOCAL ACCESS INDICATION SYSTEM

(71) Applicant: The Boeing Company, Chicago, IL (US)

(72) Inventors: Raymond Roeder, Everett, WA (US); Wade T. Price, Redmond, WA (US); Bruce R. Olsen, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 45 days.

(21) Appl. No.: 15/926,134

(22) Filed: Mar. 20, 2018

(65) Prior Publication Data

US 2019/0291691 A1 Sep. 26, 2019

(51) Int. Cl.

| | |
|---|---|
| *B60R 25/10* | (2013.01) |
| *B60R 25/30* | (2013.01) |
| *B60R 25/102* | (2013.01) |
| *G08B 13/08* | (2006.01) |
| *G08B 29/04* | (2006.01) |
| *G08B 25/10* | (2006.01) |

(52) U.S. Cl.
CPC ............ *B60R 25/10* (2013.01); *B60R 25/102* (2013.01); *B60R 25/302* (2013.01); *G08B 13/08* (2013.01); *G08B 29/046* (2013.01); *G08B 25/10* (2013.01)

(58) Field of Classification Search
None
See application file for complete search history.

(56) References Cited

U.S. PATENT DOCUMENTS

| | | | | |
|---|---|---|---|---|
| 4,897,630 | A * | 1/1990 | Nykerk | B60R 25/04 340/309.16 |
| 4,996,515 | A * | 2/1991 | Schaffer | B60R 25/10 307/10.2 |
| 5,424,712 | A * | 6/1995 | Rosenberger | B60R 25/10 340/425.5 |
| 5,900,806 | A * | 5/1999 | Issa | B60R 25/1003 180/287 |
| 6,956,467 | B1 * | 10/2005 | Mercado, Jr. | B60R 25/042 340/425.5 |
| 2005/0128068 | A1 | 6/2005 | Winick et al. | |
| 2006/0132294 | A1 * | 6/2006 | Spark | B60R 25/1003 340/426.1 |
| 2007/0219430 | A1 * | 9/2007 | Moore | G07F 17/0042 600/300 |

(Continued)

FOREIGN PATENT DOCUMENTS

| | | |
|---|---|---|
| EP | 3059719 A1 | 8/2016 |
| EP | 3113137 A1 | 1/2017 |

OTHER PUBLICATIONS

Seisdedos, Marta (EP Examiner) Extended European Search Report dated Jul. 16, 2019 in corresponding European Application No. 19164173.7 (8 pages).

*Primary Examiner* — Julie B Lieu
(74) *Attorney, Agent, or Firm* — MH2 Technology Law Group LLP

(57) ABSTRACT

A system for detecting unauthorized access to an area includes a sensor configured to be coupled to a body and to detect access to an area inside the body. The sensor is configured to transmit a signal in response to detecting access to the area. The system also includes an alert feature configured to receive the signal and to generate an alert in response to receiving the signal.

19 Claims, 3 Drawing Sheets

(56) References Cited

U.S. PATENT DOCUMENTS

| | | | |
|---|---|---|---|
| 2008/0204556 A1* | 8/2008 | de Miranda | B60R 25/102 348/148 |
| 2008/0252084 A1 | 10/2008 | Francis et al. | |
| 2011/0227712 A1* | 9/2011 | Atteck | B60R 25/10 340/429 |
| 2011/0316682 A1* | 12/2011 | Pan | B60R 25/10 340/426.24 |
| 2014/0218186 A1* | 8/2014 | Kawamoto | G01S 13/04 340/426.1 |
| 2014/0218517 A1 | 8/2014 | Kim et al. | |
| 2014/0247122 A1* | 9/2014 | Moeller | B60R 25/10 340/426.25 |
| 2015/0166010 A1* | 6/2015 | Kyung | B60R 25/302 340/426.24 |
| 2017/0136989 A1* | 5/2017 | Haber | B60R 25/1004 |

\* cited by examiner

US 10,787,151 B2

LOCAL ACCESS INDICATION SYSTEM

FIELD OF THE DISCLOSURE

The present disclosure is directed to systems and methods for monitoring unauthorized access to an area. More particularly, the present disclosure is directed to systems and methods for monitoring unauthorized access to an area and generating an alert when such access occurs (e.g., to prevent tampering).

BACKGROUND

In commercial travel, there is a need to screen and secure items placed within storage areas of commercial vehicles such as, for example, aircrafts, buses, ships, trains, or trucks. Additionally, within such commercial vehicles, there may be cabins, closets, pallets, and rooms that need to be kept closed and secured, such as maintenance areas. In many of these situations, physically locking a specific area may not be an option. For example, the bins above passengers, washrooms, and galleys may need to be easily accessible while traveling. Additionally, some enclosures may be monitored for reasons other than security such as medical supply cabinets requiring contents to be replenished as a dispatch requirement.

Oftentimes, an area is secured with an adhesive seal or tape, a tamper seal, a security seal, a security tape, a tamper-evident tape, a plastic zip-tie, or a padlock. In general, these devices are designed to be visually inspected to determine if tampered with or broken. As an example, such devices are utilized in commercial aircraft to help ensure that any items placed onto the aircraft have been cleared by the relevant security personnel, and once cleared, those items are sealed to make sure that they cannot be tampered with before, during, and after the flight.

While useful, these types of security seals or devices require the relevant security personal or crew member to walk through the vehicle and visually, and possibly physically, inspect each security seal or device individually to see if it has been tampered with. As a result, this leads to increased manual labor costs related to the physical inspection of all of the security seals or devices on the vehicle. Further, there may be significant delay between the time of the tampering and time of physical inspection. Therefore, there is a need for a system and method that addresses the limitations of the known security seals and devices.

SUMMARY

A system for detecting unauthorized access to an area includes a sensor configured to be coupled to a body and to detect access to an area inside the body. The sensor is configured to transmit a signal in response to detecting access to the area. The system also includes an alert feature configured to receive the signal and to generate an alert in response to receiving the signal.

In another implementation, the system includes a sensor configured to be coupled to a body in a vehicle and to detect access to an area inside the body. The sensor is configured to transmit a first signal in response to detecting access to the area. The system also includes a controller spaced apart from the sensor and configured to receive the first signal and to transmit a second signal in response to receiving the first signal. The controller includes a first display configured to allow an authorized personnel member to interface with the system. The system also includes an alert feature spaced apart from the sensor and configured to receive the second signal and to generate an alert in response to receiving the second signal. The alert feature comprises a second display configured to allow the authorized personnel member to interface with the system.

A method for detecting unauthorized access to an area is also disclosed. The method includes coupling a sensor to a body. The sensor is configured to detect a change of state while monitoring access to an area inside the body, and the sensor is configured to transmit a signal in response to the change of state. The method also includes positioning an alert feature within a first predetermined distance of the sensor. The alert feature is configured to receive the signal, to determine when access to the area inside the body has occurred in response to the signal, and to generate an alert in response to determining that the area inside the body has been accessed.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
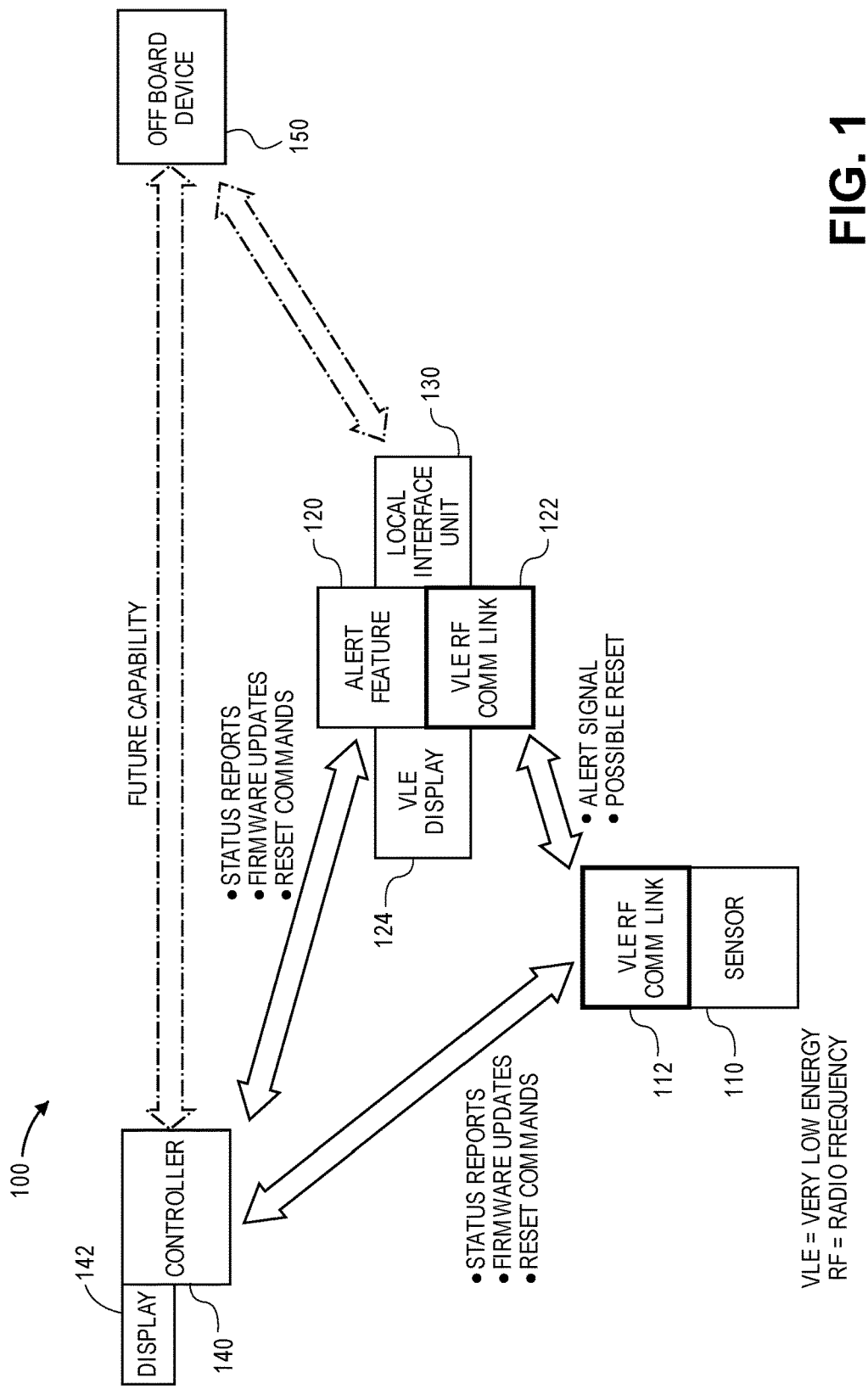
FIG. 1 illustrates a schematic view of a system for monitoring unauthorized access to an area.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

FIG. 1 illustrates a schematic view of a system 100 for monitoring unauthorized access to an area. The system 100 includes one or more sensors (one is shown: 110). The sensor 110 may be configured to sense one or more properties that are indicative of unauthorized access to an area. More particularly the sensor 110 may be configured to sense motion, temperature, light, magnetic field, GPS signals, electrical properties and/or continuity, pressure, specific chemicals, biological, nuclear, audio or video, which may be indicative of unauthorized access to an area. The sensor 110 may be in a first (e.g., untampered) state prior to sensing the properties, and the sensor 110 may actuate into a second (e.g., tampered) state in response to sensing the properties. In one example, the sensor 110 may be or include a pico cell sensor. As used herein, a pico sensor cell refers to a small sensor network that covers a small space, such as inside a building (e.g., offices, shopping malls, train stations, stock exchanges) or an aircraft which is unfederated from other systems within the space.

The sensor 110 is a wireless tamper device (WTD). The WTD includes a transmitter, a multi-layer probe having predetermined electrical characteristics, a processing device, and a power supply. The processing device is in signal communication with the multi-layer probe, and the power supply is in signal communication with the transmitter and processing device. The processing device includes a processor and a computer-readable medium (CRM). The CRM has encoded thereon computer-executable instructions to cause the processor to initiate the WTD to the untampered state, detect a physical trigger on the multi-layer probe, and in response to detecting the physical trigger, actuate the WTD to the tampered state and (e.g., immediately) transmit a tamper event alert (e.g., to a local interface unit (LIU) 130 and/or controller 140, which are discussed in more detail below). In at least one implementation, the sensor 110 may be or include the WTD described in U.S. patent application Ser. No. 15/829,876, which is hereby incorporated by reference in its entirety.

The system 100 may also include a communication link 112 that is coupled to and/or in (e.g., wired) communication with the sensor 110. The communication link 112 may be or include a very-low-energy (VLE) radio-frequency (RF) communication link. For example, the communication link 112 may use common coin cell batteries, and may operate in a frequency band from about 830 MHz to about 60 GHz. As described in greater detail below, the communication link 112 may be able to transmit signals from the sensor 110 and/or receive signals that are transmitted to the sensor 110. The signals may be wired or wireless.

The system 100 may also include one or more alert features (one is shown: 120). The alert feature 120 may be configured to receive a signal from the (communication link 112 of the) sensor 110 when the sensor 110 detects unauthorized access to an area. In response to receiving the signal, the alert feature 120 may actuate from the first (e.g., untampered) state into the second (e.g., tampered) state. In the first state, the alert feature 120 may be passive (i.e., not generating an alert), and in the second state, the alert feature 120 may be active (i.e., generating an alert). The alert may be audible, visual, or both. For example, the alert feature 120 may generate a noise that may be heard within a predetermined distance (e.g., 20 meters). In another example, the alert feature 120 may generate a flashing light. The alert feature 120 is designed to capture the attention of an authorized personnel member and to inform the authorized personnel member that the area has been accessed by an unauthorized person. As used herein, an authorized personnel member may be or include a person that works on the vehicle and/or has authorization to access the area, and an unauthorized personnel member may include a person that does not work on the vehicle and/or does not have authorization to access the area. The alert feature 120 may include a reset feature for itself and/or for the sensor 110 (e.g., when the sensor 110 is re-usable).

The system 100 may also include a communication link 122 that is coupled to and/or in (e.g., wired) communication with the alert feature 120. The communication link 122 may be similar to the communication link 112 described above. As described in greater detail below, the communication link 122 may be able to transmit signals from the alert feature 120 and/or receive signals that are transmitted to the alert feature 120. The signals may be wired or wireless. For example, the (communication link 112 of the) sensor 110 may transmit a (e.g., wireless) signal to the (communication link 122 of the) alert feature 120 instructing the alert feature 120 to generate the alert. In another example, the (communication link 112 of the) sensor 110 may transmit a (e.g., wireless) signal to the (communication link 122 of the) alert feature 120 instructing the alert feature 120 to reset back to the first (i.e., passive) state.

The system 100 may also include a VLE display 124 that is coupled to and/or in (e.g., wired) communication with the alert feature 120 and/or the communication link 122. The display 124 may be used to identify the current state of the system (e.g., armed or disarmed, maintenance mode, or other), identify location of a tamper event (e.g., access door in aft wall, ceiling, etc.), or other pertinent information for the authorized personnel member to consider before taking actions. The display 124 may further include user interface menus for such activity as maintenance actions, history of events, battery charge level checks, fault isolation, etc.

The system 100 may also include a local interface unit (LIU) 130. The LIU 130 may provide power to the sensor 110 and/or the alert feature 120. More particularly, the LIU 130 may harvest power from alternative current (AC) wiring to power the alert feature 120 and the communication link 122 upon access to an event (e.g., the area being accessed). Thus, the LIU 130 may be an alternative to battery power.

The system 100 may also include a controller 140. The controller 140 is a user interface and includes a display 142 such as described above or other style of display for commanding the system 100 for such things as arm and disarm commands, and obtaining status reports which may include information related to the current state of the sensor 110 and alert feature 120, past record logs of reports or activations, time records of events, configurations summaries and data, software version and history, software updates, system health check, battery level checks, fault isolation and troubleshooting, etc. The controller 140 is in communication with the (communication link 112 of the) sensor 110 and/or the (communication link 122 of the) alert feature 120. The signals transmitted between the (communication link 112 of the) sensor 110 and the controller 140 and/or between the (communication link 122 of the) alert feature 120 and the controller 140 may be or include status reports, firmware updates, and/or reset commands. In at least one implementation, the controller 140 may be combined with the alert feature 120 into a single, integral unit.

Each element/component (e.g., the sensor 110, the alert feature 120, the LIU 130, and/or the controller 140) may have a unique identifier to ensure that the system 100 is communicating correctly. The unique identifier(s) may be associated with the encryption attributes to ensure a secure communication link. Also, at the time of initial installation, the element/component may be associated with a location for later reference when investigation an access event. The data associated with the unique identifier may be retained at the element/component in a local accessible memory. It is the combination of the unique identifier and associated attributes, at least including encryption data and location information, that make up the aforementioned configurations and summaries data.

The sensor 110, the alert feature 120, the LIU 130, and/or the controller 140 may be on-board a vehicle or in a room in a building, and installed either within the area being monitored or in near proximity for wireless communications. The vehicle may be or include an aircraft, a bus, a ship, a train, a car, or a truck. In one example, the system 100 may also include an off-board device 150. The off-board device 150 may be off of the vehicle, outside of the room, or brought onto/into the area being monitoring and later removed. The off-board device 150 may be in communication with the VLE RF communication links 112 and/or 122, and/or the controller 140 to transmit signals back and forth relating to future capabilities, undetermined protocols, or the like. When the controller 140 is combined with the alert feature 120 into a single unit, the off-board device 150 may communicate directly with the (communication link 122 of the) alert feature 120. In another implementation, the controller 140 may be omitted, and the (communication link 122 of the) alert feature 120 may provide alternate means of communication with the off-board device 150.

Figure 2:
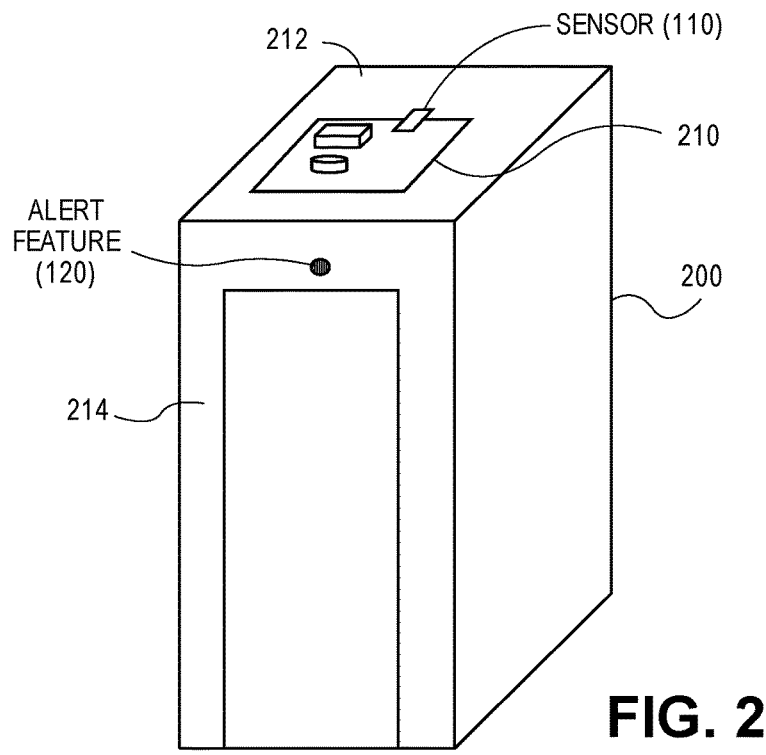
FIG. 2 illustrates a perspective view of an example of the system for monitoring unauthorized access to an area.

FIG. 2 illustrates a perspective view of an example of the system 100 (without the LIU 130 and controller 140) for monitoring unauthorized access to an area. The area may be positioned in or otherwise part of a body 200, such as a bin, a washroom, a galley, a closet, or the like. In the example shown, the area is positioned in a body (e.g., a bin) 200 having a door 210 that provides access to the area inside. The sensor 110 may be coupled to the body 200, the door 210, or both. When the door 210 is opened, the sensor 110 may actuate from the first state into the second state, which causes the (communication link 112 of the) sensor 110 to transmit a signal to the (communication link 122 of the) alert feature 120 instructing the alert feature 120 to actuate from the first state into the second state (i.e., to generate the alert). In this example, the LIU 130 and the controller 140 are omitted, and the signal is transmitted directly, wirelessly from the sensor 110 to the alert feature 120. Authorized personnel may deactivate the sensor 110 prior to opening the door 210 to avoid inadvertently generating the alert.

The alert feature 120 may be coupled to the body 200 or elsewhere in the room or vehicle where the alert may be easily seen and/or heard. As shown, the sensor 110 is on a first (e.g., top) surface 212 of the body 200 that includes the door 210, and the alert feature 120 is on a second (e.g., front) surface 214 of the body 200. The sensor 110 and the alert feature 120 may be positioned close enough to one another to allow the (communication link 112 of the) sensor 110 to (e.g., wirelessly) communicate with the (communication link 122 of the) alert feature 120.

Thus, the system 100 may allow for wireless indication and alerts in real-time when an unauthorized person accesses the area (e.g., opens the door 210). In one example, the sensor 110 and/or the alert feature 120 may be powered by batteries, as opposed to being powered by the vehicle power supply. The batteries may have a life span up to or exceeding 7 years.

Figure 3:
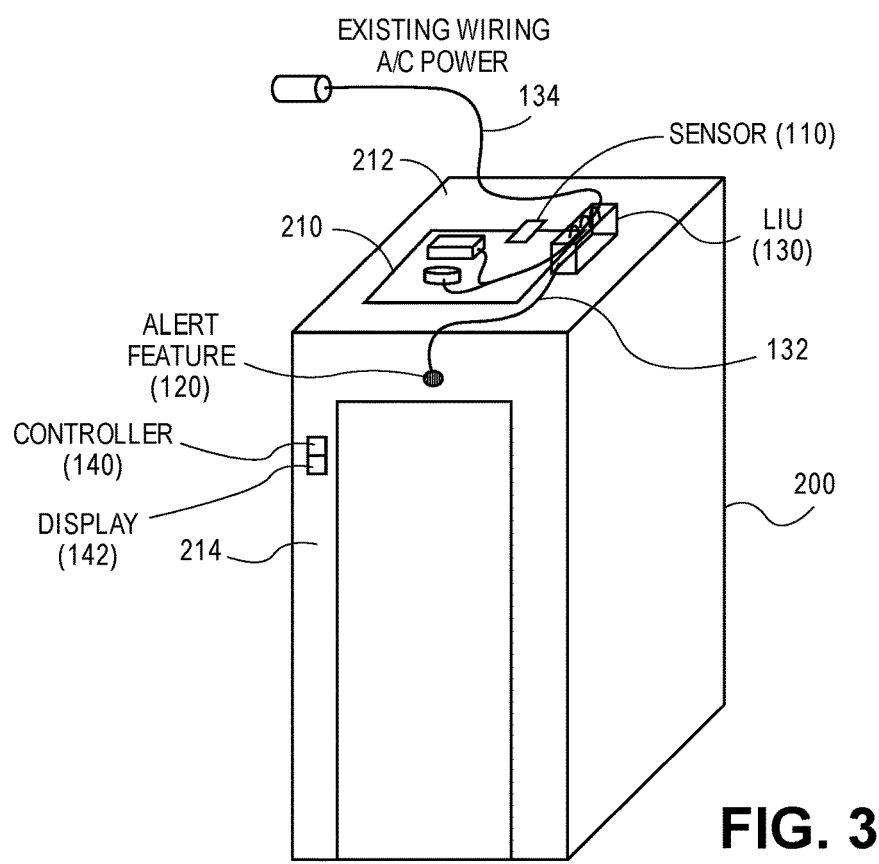
FIG. 3 illustrates a perspective view of another example of the system for monitoring unauthorized access to an area.

FIG. 3 illustrates a perspective view of another example of the system 100 (with the LIU 130 and controller 140) for monitoring unauthorized access to an area. The LIU 130 and the controller 140 may be coupled to the body 200 or elsewhere in the room or vehicle. As shown, the LIU 130 is on the first (e.g., top) surface 212 of the body 200 that includes the sensor 110 and the door 210, and the controller 140 is coupled to the second (e.g., front) surface 214 of the body 200 that includes the alert feature 120. However, as will be appreciated, in other implementations, the alert feature 120 and the controller 140 may be mounted elsewhere (i.e., not on the second side 214), but in communication range of the sensor 110 and/or the LIU 130. The controller 140 may act as the interface for human interaction, and include the display 142 as well as the ability to respond to and input to the system 100 (e.g., initiating the first state, query current conditions/states, display access event information, turn off alerts, re-initiate to secure first state, etc.). The sensor 110 may communicate with the controller 140 when the sensor 110 actuates into the second state (e.g., the door 210 is opened). In alternative implementation, the sensor 110 may communicate its state to the controller 140 at periodic intervals (e.g., once per minute), whether in the first state or the second state. The sensor 110, the alert feature 120, and/or the controller 140 may be powered via inductive current from the LIU 130 through AC wiring 132, 134 (e.g., from an electrical shaver power outlet).

Figure 4:
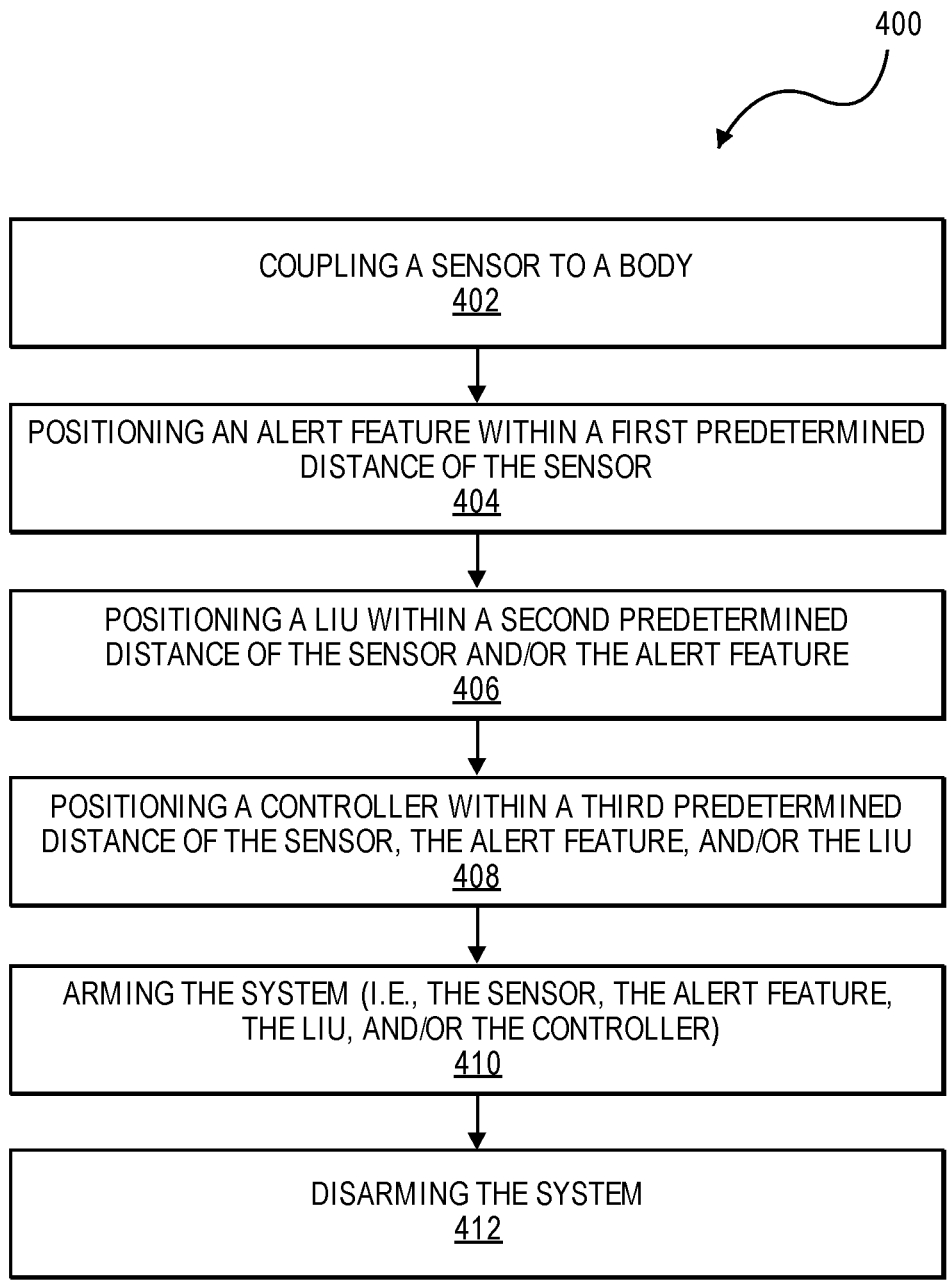
FIG. 4 illustrates a flowchart of a method for monitoring unauthorized access to an area.

FIG. 4 illustrates a flowchart of a method 400 for monitoring unauthorized access to an area. The method 400 may include coupling the sensor 110 to the body 200, as at 402. The sensor 110 may be coupled to the body 200 in a manner that allows the sensor 110 to monitor access to an area. The area may be inside the body or outside the body 200. As shown in FIGS. 2 and 3, the sensor 110 may be coupled to or otherwise positioned proximate to the door 210, which may be opened to provide access to the area.

The method 400 may also include positioning the alert feature 120 within a first predetermined distance of the sensor 110, as at 404. In one implementation, the sensor 110 may be coupled to the alert feature 120 via one or more wires (e.g., to allow communication therebetween), and the first predetermined distance may be the length of the wire. In another implementation, the sensor 110 and the alert feature 120 may communicate wirelessly, and the first predetermined distance may be the maximum wireless transmission range. The alert feature 120 may be coupled to the body 200.

The method 400 may also include positioning the LIU 130 within a second predetermined distance of the sensor 110 and/or the alert feature 120, as at 406. In one implementation, the LIU 130 may be connected to the sensor 110 and/or the alert feature 120 via one or more wires (e.g., to allow communication therebetween), and the second predetermined distance may be the length(s) of the wire(s). In yet other implementations, the LIU 130 may be omitted. The LIU 130 may be coupled to the body 200.

The method 400 may also include positioning the controller 140 within a third predetermined distance of the sensor 110, the alert feature 120, and/or the LIU 130, as at 408. In one implementation, the controller 140 may be coupled to the sensor 110, the alert feature 120, and/or the LIU 130 via one or more wires (e.g., to allow communication therebetween), and the third predetermined distance may be the length of the wire. In another implementation, the controller 140 may communicate wirelessly with the sensor 110 and/or the alert feature 120, and the third predetermined distance may be the maximum wireless transmission range. The controller 140 may be coupled to the body 200.

The method 400 may also include arming/activating the system 100 (i.e., the sensor 110, the alert feature 120, the LIU 130, and/or the controller 140), as at 410. Arming the system 100 may include flipping a switch to supply power to the sensor 110, the alert feature 120, the LIU 130, and/or the controller 140. As mentioned above, the power may be via one or more batteries or from the vehicle or building. Further, arming may be a software command from the human interface display.

Once armed, the system 100 may generate an alert if the area is accessed by an unauthorized person. More particularly, if an unauthorized person opens the door 210 or moves, removes, or otherwise tampers with the sensor 110, the sensor 110 may actuate from the first state to the second state. When in the second state, the sensor 110 transmits a signal to the alert feature 120 directly, or indirectly via the controller 140. The alert feature may determine from the receive sensor state change if the access was during an armed system state. When the sensor second state is determined to be an unauthorized access, the alert feature 120 changes from its first state to a second state, which generates an alert.

The method 400 may also include disarming/deactivating the system 100 (i.e., the sensor 110, the alert feature 120, the LIU 130, and/or the controller 140), as at 412. In one implementation, the system 100 may be disarmed by an authorized personnel member prior to the alert being generated to allow the authorized personnel member to access the area (i.e., to get his/her wallet, phone, etc.).

In another implementation, the system 100 may be disarmed by the authorized personnel member in response to the alarm being generated. More particularly, the alarm may signal the authorized personnel member to come check to see if the area has been accessed by an unauthorized person or if one or more parts of the system have been tampered with. In another implementation, the alarm may signal the authorized personnel member to come check to see if the inventory within the body 200 (e.g., a first aid kit) needs to be replenished. If the system 100 indicates that there has been no access to the body 200, the authorized personnel member may direct his/her attention to other areas requiring attention/service, knowing that the stock of materials within the compartment is unchanged. Before or after checking this, the authorized personnel member may disarm the system 100 to cause the alarm to cease. Disarming the system 100 may include flipping a switch to cut off the power supply to the sensor 110, the alert feature 120, the LIU 130, and/or the controller 140. In another implementation, disarming the system 100 may include selecting a reset function on the sensor 110, the alert feature 120, the LIU 130, and/or the controller 140.

In at least one implementation, a unique identifier and detail data may be received from the communication link 112 of the sensor 110 and/or the communication link 122 of the alert feature 120. The sensor 110 and/or the alert feature 120 may be identified based upon the unique identifier. A timing associated with the change of state of the sensor 110 may also be identified based upon the unique identifier and/or the detail data.

In at least one implementation, a remaining battery charge level of the sensor 110 and/or the alert feature 120 may be determined based at least partially upon the detail data. The detail data may include security attributes for authentication and encryption, software version history, information about the state of the sensor, time of changes or revisions, and/or historical records of past events. Access to the area may also be determined to be unauthorized based upon the detail data.

A report may be generated for the sensor or the alert feature that indicates whether the area has been accessed, a timing associated with an inquiry for the report, a timing associated with an activation of the sensor or the alert feature, a remaining battery charge level of the sensor or the alert feature, and/or a location description for the sensor based upon the configuration data and the unique identifier.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A system for detecting access to an area, comprising:
   a sensor configured to be coupled to a body and to detect access to an area inside the body by an unauthorized personnel member in response to sensing a magnetic field, a pressure, a chemical signature, a biological signature, a nuclear signature, or a combination thereof, wherein the body is inside a vehicle, and wherein the sensor is configured to transmit a signal in response to detecting access to the area;
   an alert feature configured to receive the signal and to generate an alert in response to receiving the signal; and
   a local interface unit configured to begin harvesting power from an alternating current source upon detecting access to the area and to provide the power to the alert feature.

2. A system for detecting unauthorized access to an area, comprising:
   a sensor configured to be coupled to a body to detect access to an area inside the body by an unauthorized personnel member in response to sensing a magnetic field, a pressure, a chemical signature, a biological signature, a nuclear signature, or a combination thereof, wherein the body is inside an aircraft, wherein the sensor is configured to transmit a first signal in response to detecting access to the area, and wherein the area comprises an inventory comprising a first-aid kit;
   a controller spaced apart from the sensor and configured to receive the first signal and to transmit a second signal in response to receiving the first signal, wherein the controller comprises a first display configured to allow an authorized personnel member to interface with the system;

an alert feature spaced apart from the sensor and configured to receive the second signal and to generate an alert in response to receiving the second signal, wherein the alert feature comprises a second display configured to allow the authorized personnel member to interface with the system, wherein the alert signals the authorized personnel member to determine whether the unauthorized personnel member has accessed the inventory inside the area and to determine whether the inventory inside the area needs to be replenished, and wherein no alert signals the authorized personnel member that the inventory inside the area is unchanged; and a local interface unit configured to begin harvesting power from an alternating current source upon detecting access to the area, to provide the power to the alert feature.

3. The system of claim 2, wherein the body is part of the vehicle, and wherein the alternating current source is a power source of the vehicle.

4. The system of claim 2, wherein the sensor is coupled to a first side of the body, wherein the alert feature is coupled to a second side of the body, and wherein the controller is coupled to the second side of the body, a side of the body other than the first or second sides, or to a remote surface within the vehicle.

5. The system of claim 2, wherein the sensor is configured to detect access to the area inside the body by the unauthorized personnel member in response to sensing the magnetic field.

6. The system of claim 2, wherein the sensor is configured to detect access to the area inside the body by the unauthorized personnel member in response to sensing the pressure.

7. The system of claim 2, wherein the sensor is configured to detect access to the area inside the body by the unauthorized personnel member in response to sensing the chemical signature.

8. The system of claim 2, wherein the sensor is configured to detect access to the area inside the body by the unauthorized personnel member in response to sensing the biological signature.

9. The system of claim 2, wherein the sensor is configured to detect access to the area inside the body by the unauthorized personnel member in response to sensing the nuclear signature.

10. A method for detecting unauthorized access to an area, comprising:

coupling a sensor to a body, wherein the body is inside a vehicle, wherein the sensor is configured to detect a change of state in response to access to an area inside the body by an unauthorized personnel member by sensing a magnetic field, a pressure, a chemical signature, a biological signature, a nuclear signature, or a combination thereof, and wherein the sensor is configured to transmit a signal in response to the change of state;

positioning an alert feature within a first predetermined distance of the sensor, wherein the alert feature is configured to receive the signal, to determine when access to the area inside the body has occurred in response to the signal, and to generate an alert in response to determining that the area inside the body has been accessed; and positioning a local interface unit within a second predetermined distance of the sensor, the alert feature, or both, wherein the local interface unit is configured to begin harvesting power from an alternating current source upon detecting access to the area and to provide the power to the alert feature.

11. The method of claim 10, further comprising:

receiving at least one unique identifier and detail data from a very-low-energy radio-frequency communication link of the sensor or the alert feature;

identifying the sensor or the alert feature based upon the unique identifier; and identifying a timing associated with the change of state detected by the sensor.

12. The method of claim 11, further comprising determining a remaining battery charge level of the sensor or the alert feature based at least partially upon the detail data.

13. The method of claim 11, wherein the detail data comprises at least one of security attributes for authentication and encryption, software version history, information about a state of the sensor, time of changes or revisions, or historical records of past events.

14. The method of claim 11, further comprising determining when access to the area is unauthorized based at least upon the detail data.

15. The method of claim 11, further comprising generating a report for the sensor or the alert feature, wherein the report indicates at least one of:

whether the area has been accessed, a timing associated with an inquiry for the report, a timing associated with an activation of the sensor or the alert feature, a remaining battery charge level of the sensor or the alert feature, or location description for the sensor based upon configuration data and the unique identifier.

16. The method of claim 10, wherein coupling the sensor to the body comprises coupling the sensor to a door of the body, and wherein the door is configured to be opened to provide access to the area.

17. The method of claim 10, further comprising interfacing with a display at the alert feature to input or receive system status information.

18. The method of claim 17, wherein the system status information comprises information related to isolating a fault.

19. The method of claim 17, wherein inputting system status information comprises maintaining software revisions, updates, and security protocols.

* * * * *

UNITED STATES PATENT AND TRADEMARK OFFICE
CERTIFICATE OF CORRECTION

PATENT NO. : 10,787,151 B2
APPLICATION NO. : 15/926134
DATED : September 29, 2020
INVENTOR(S) : Raymond Roeder, Wade T. Price and Bruce R. Olsen It is certified that error appears in the above-identified patent and that said Letters Patent is hereby corrected as shown below:

In the Claims

Column 9, Line 15, Claim 2, delete "access to the area, to provide the power to the alert", and insert therefor --access to the area and to provide the power to the alert--.

Signed and Sealed this
Sixth Day of April, 2021

Drew Hirshfeld
*Performing the Functions and Duties of the
Under Secretary of Commerce for Intellectual Property and
Director of the United States Patent and Trademark Office*